US012700306B2

(12) United States Patent
Davies

(10) Patent No.: US 12,700,306 B2
(45) Date of Patent: Aug. 4, 2026

(54) TRAFFIC INTERSECTION

(71) Applicant: Richard Davies, Dublin (IE)

(72) Inventor: Richard Davies, Dublin (IE)

( * ) Notice: Subject to any disclaimer, the term of this patent is extended or adjusted under 35 U.S.C. 154(b) by 736 days.

(21) Appl. No.: 18/102,888

(22) Filed: Jan. 30, 2023

(65) Prior Publication Data

US 2023/0252893 A1 Aug. 10, 2023

(30) Foreign Application Priority Data

Feb. 4, 2022 (GB) ...................................... 2201444

(51) Int. Cl.

*G08G 1/09* (2006.01)
*G08G 1/00* (2006.01)
*G08G 1/005* (2006.01)
*G08G 1/07* (2006.01)
*G08G 1/095* (2006.01)

(52) U.S. Cl.

CPC ............. *G08G 1/095* (2013.01); *G08G 1/005* (2013.01); *G08G 1/07* (2013.01)

(58) Field of Classification Search

CPC ........... E01C 1/02; E01C 1/002; G08G 1/005; G08G 1/095

See application file for complete search history.

(56) References Cited

U.S. PATENT DOCUMENTS 1,543,080 A * 6/1925 Graves ...................... E01C 1/04 404/1
5,278,554 A 1/1994 Marton
5,795,095 A * 8/1998 Heller ........................ E01C 1/02 404/1
9,953,527 B1 * 4/2018 Alhazmi ................... E01C 1/02
2002/0076276 A1 * 6/2002 Troemel .................... E01C 1/02 404/1
2023/0332360 A1 * 10/2023 Grotbeck ................ E01C 1/002

FOREIGN PATENT DOCUMENTS

CN 101187192 A 5/2008
CN 103325265 A 9/2013
CN 105951545 A 4/2016
CN 106758615 A * 5/2017 ............... E01C 1/02
WO 2021107952 A1 6/2021

OTHER PUBLICATIONS

Search Report dated May 17, 2023 in corresponding application GB202201444A.

* cited by examiner

*Primary Examiner* — Abigail A Risic

(74) *Attorney, Agent, or Firm* — Vitale, Vickrey, Niro, Solon & Gasey LLP

(57) ABSTRACT

A traffic intersection (100) comprising first and second approach portions (107, 108, 109, 110) configured to permit travel towards said intersection (100) only from first and second approach directions respectively, and first and second exit portions (111, 112, 113, 114) configured to permit travel away from said intersection (100) only in first and second exit directions respectively, wherein the intersection (100) is configured to direct approaching traffic from each approach portion to either exit portion.

16 Claims, 13 Drawing Sheets

TRAFFIC INTERSECTION

FIELD OF THE INVENTION

This invention relates to a traffic intersection.

BACKGROUND OF THE INVENTION

Many cities, particularly cities which are wholly or partially based on a grid plan (also known as a grid street plan or a gridiron plan) have a plurality of 4-way intersections. Due to a high volume of traffic, 4-way intersections will typically use traffic lights at some or all intersections because each vehicle approaching an intersection on a particular street will have a choice of 3 other streets to exit the intersection, thus, other vehicles entering the intersection from different directions may need to stop in order for the first vehicle to proceed safely.

City planners often implement one-way traffic systems in an effort to improve traffic flow in high traffic volume areas. Typical one-way traffic flow systems implemented in cities that either fully or partially utilize a grid plan street layout, involve alternating the direction of flow of vehicular traffic on parallel streets (e.g., of the east-west oriented streets, only streets numbered 1, 3, 5, 7 etc. will be permitted to travel from west to east, and on streets numbered 2, 4, 6, 8, etc., the only permitted direction of travel will be from east to west). Similarly, the vehicular traffic flow on the perpendicular streets, that are north-south oriented, will also alternate direction. These one-way systems still require the use of traffic lights to regulate the flow of vehicles through intersections because many intersections will require vehicles to stop to allow vehicles from a perpendicular direction to cross those intersections. While traffic lights at intersections are still required, the number of traffic light indicator phases are reduced which will reduce the average amount of time that vehicles are stopped at intersections.

It is desirable to provide a traffic intersection that maintains safe movement of traffic therethrough whilst permitting continuous or near continuous travel by vehicles entering said intersection from all directions.

SUMMARY OF THE INVENTION

According to the invention there is provided a traffic intersection comprising first and second approach portions configured to permit travel towards said intersection only from first and second approach directions respectively, and first and second exit portions configured to permit travel away from said intersection only in first and second exit directions respectively, wherein the intersection is configured to direct approaching traffic from each approach portion to either exit portion.

Advantageously, approaching vehicles do not need to stop at the intersection for other vehicles to cross their path. Additionally, traffic lights may only be required to stop vehicles in the case that pedestrians desire to cross the intersection. In this way, this intersection arrangement could greatly reduce the average amount of time that vehicles are stopped at an intersection.

Ideally, the first and second approach directions are generally opposing approach directions.

Preferably, the first and second exit directions are generally opposing exit directions.

Ideally, each approach portion is in connection with both exit portions such that traffic may flow from each approach portion to either exit portion.

Preferably, each approach portion comprises a plurality of approach lanes.

Ideally, each exit portion comprises a plurality of exit lanes.

Preferably, each approach lane is in connection with at least one exit lane such that traffic may flow between each approach lane and at least one exit lane.

Ideally, the intersection is arranged such that the approach portions generally oppose each other and the exit portions are disposed generally perpendicular to the approach portions.

Preferably, each approach portion, combined with at least one lane from each exit portion, forms a T-Junction such that traffic may travel towards the intersection on the approach portion and thereafter may not travel directly forwards but may turn generally right or left onto the first or second exit portion respectively.

Ideally, two T-junctions are formed back to back to form the intersection.

Preferably, the exit portions of each of the two T-junctions are arranged perpendicularly and positioned such that said exit portions abut about their sides distal their approach portions.

Preferably, the total number of approach lanes is equal to the total number of exit lanes.

Ideally, the total number of approach lanes in the first and second approach portions which are in connection with exit lanes in the first exit portion is equal to the total number of exit lanes in said first exit portion.

Preferably, the total number of approach lanes in the first and second approach portions which are in connection with exit lanes in the second exit portion is equal to the total number of exit lanes in said second exit portion.

Preferably, the intersection may comprise a central hub feature disposed centrally of the first and second approach portions and the first and second exit portions.

Ideally, traffic may not travel on or otherwise traverse the central hub feature.

Preferably, the central hub is defined by the innermost side of the innermost lanes of the approach portions and the exit portions.

Ideally, the central hub is provided with barriers or the like around all or part of the innermost side of the innermost lanes of the approach portions and the exit portions to prevent traffic from travelling onto the central hub.

Preferably, the intersection comprises connecting portions, said connecting portions forming a transition between the approach portions and the exit portions.

Ideally, the connecting portions have a first end in connection with an approach portion and a second end in connection with an exit portion and traffic enters the first end from the approach portion and exits the second end into the exit portion.

Preferably, the connecting portions are curved.

Preferably, the connecting portions are curved such that the direction of traffic exiting the second end thereof is generally perpendicular to the direction of said traffic entering the first end thereof.

Ideally, the central hub is defined by the connecting portions.

Preferably, pedestrian crossings are provided on the approach portions, the exit portions, and/or the connecting portions of the intersection.

Ideally, pedestrian crossings are provided with traffic lights to stop traffic on the approach portions, the exit portions, and/or the connecting portions of the intersection, or on one or more lanes of the approach portions, the exit portions, and/or the connecting portions.

According to a second aspect of the invention there is provided a street arrangement comprising a plurality of intersections, each intersection comprising first and second approach portions configured to permit travel towards said intersection only from first and second approach directions respectively, and first and second exit portions configured to permit travel away from said intersection only in first and second exit directions respectively, wherein the intersection is configured to direct approaching traffic from each approach portion to either exit portion.

Preferably, the street arrangement comprises an alternating arrangement of intersections such that each intersection forms a central intersection which connects to four other surrounding intersections, one further intersection being connected by each of the first approach portion, the second approach portion, the first exit portion and the second exit portion.

Ideally, the four surrounding intersections in connection with the central intersection are rotated relative to the central intersection, when viewed from the top, such that their exit portions are aligned to connect to an approach portion of the central intersection and their approach portions are aligned to connect to an exit portion of the central intersection.

Preferably, the four surrounding intersections in connection with the central intersection are rotated relative to the central intersection by approximately 90 degrees.

According to a third aspect of the invention there is provided an intermediate intersection configured for deployment between two traffic intersections, the traffic intersections comprising first and second approach portions configured to permit travel towards said intersection only from first and second approach directions respectively, and first and second exit portions configured to permit travel away from said intersection only in first and second exit directions respectively, wherein the intersection is configured to direct approaching traffic from each approach portion to either exit portion.

BRIEF DESCRIPTION OF THE DRAWINGS

An embodiment of the invention is now described by way of example and with reference to the accompanying drawings in which.

DETAILED DESCRIPTION OF THE DRAWINGS

The present teaching will now be described with reference to an exemplary traffic intersection. It will be understood that the exemplary traffic intersection is provided to assist in an understanding of the present teaching and are not to be construed as limiting in any fashion. Furthermore, elements or components that are described with reference to any one Figure may be interchanged with those of other Figures or other equivalent elements without departing from the spirit of the present teaching. For the purpose of only describing the relationship of the roads relative to each other, the following descriptions refer to the directions of north, south, east and west, these being relative to the top views shown in each Figure. However, referring to the specific directions is only for the purpose of explanation and does not limit the particular orientation of the various road surfaces to particular compass points.

Figure 1:
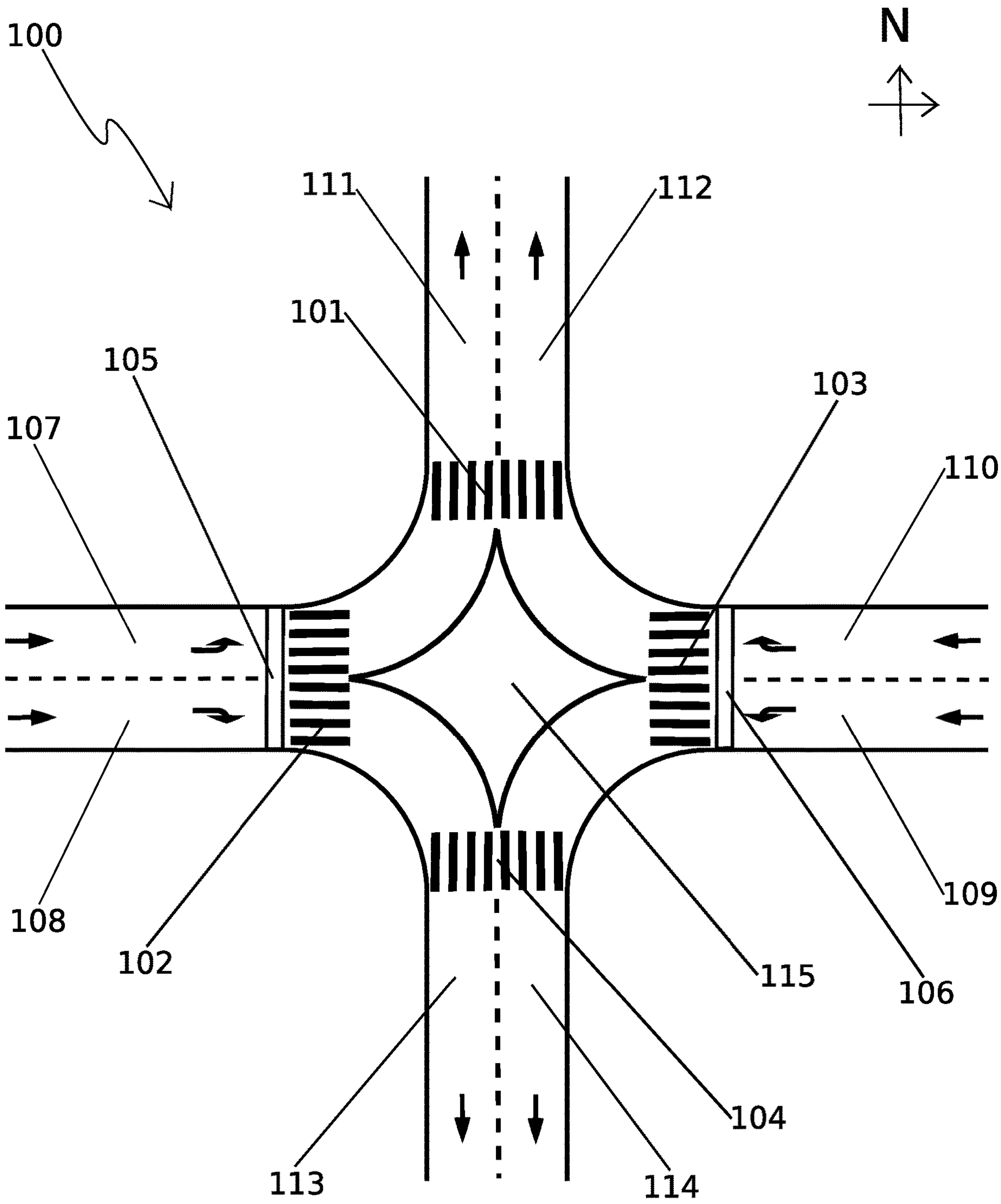
FIG. 1 is a top view of an intersection illustrating a double-T type junction according to the invention.

Referring now to the Figures, FIG. 1 illustrates one embodiment of a traffic intersection. In preferred embodiments the intersections of FIGS. 1 to 7 form what will hereinafter be described as "double-T" junctions. Each Street in FIG. 1 is a one-way Street. The street entering the "double-T" junction (100) from the West direction comprises two lanes; vehicles travelling in the left-hand lane (107) are required to turn left at the intersection and exit the "double-T" junction (100) in the North direction in lane (111). Vehicles travelling in the right-hand lane (108) are required to turn right at the intersection and exit the "double-T" junction (100) in the South direction in lane (113). The street entering the "double-T" junction (100) from the East direction comprises of two lanes, vehicles travelling in the left-hand lane (109) are required to turn left at the intersection and exit the "double-T" junction (100) in the South direction in lane (114). Vehicles travelling in the right-hand lane (110) are required to turn right at the intersection and exit the "double-T" junction (100) in the North direction in lane (112).

Also included in FIG. 1 are optional vehicular traffic treatments, including vehicular stop lines (105, 106), vehicular traffic lane marking lines and vehicular traffic lane direction indication markings. Optional pedestrian crosswalks (101, 102, 103, 104) are also included in FIG. 1.

The "double-T" junction has the advantage of low cost since no costly overpass structures need be constructed in order to facilitate free-flowing vehicular traffic. Existing streets or highways can be employed with only minor structural modifications.

A further advantage of the "double-T" junction (100) could be its potential for reducing collisions between vehicles at intersections. Currently, a large proportion of serious collisions occur at intersections. Removing the instances where vehicles must cross lanes of oncoming traffic will act to reduce the number of accidents that occur.

Also included in FIG. 1 is an area (115) at the center of the intersection which will not be used by vehicular traffic. This area could be protected by physical barriers that would prevent vehicular traffic from straying from their own traffic lane and interfering with traffic in other lanes. This could further reduce the instances of serious collisions between vehicles at intersections. This area (115), could also be used to host a variety of different city amenities such as street lighting, advertisement hoardings, trees, plants or other decorative features such as fountains and sculptures.

Figure 2:
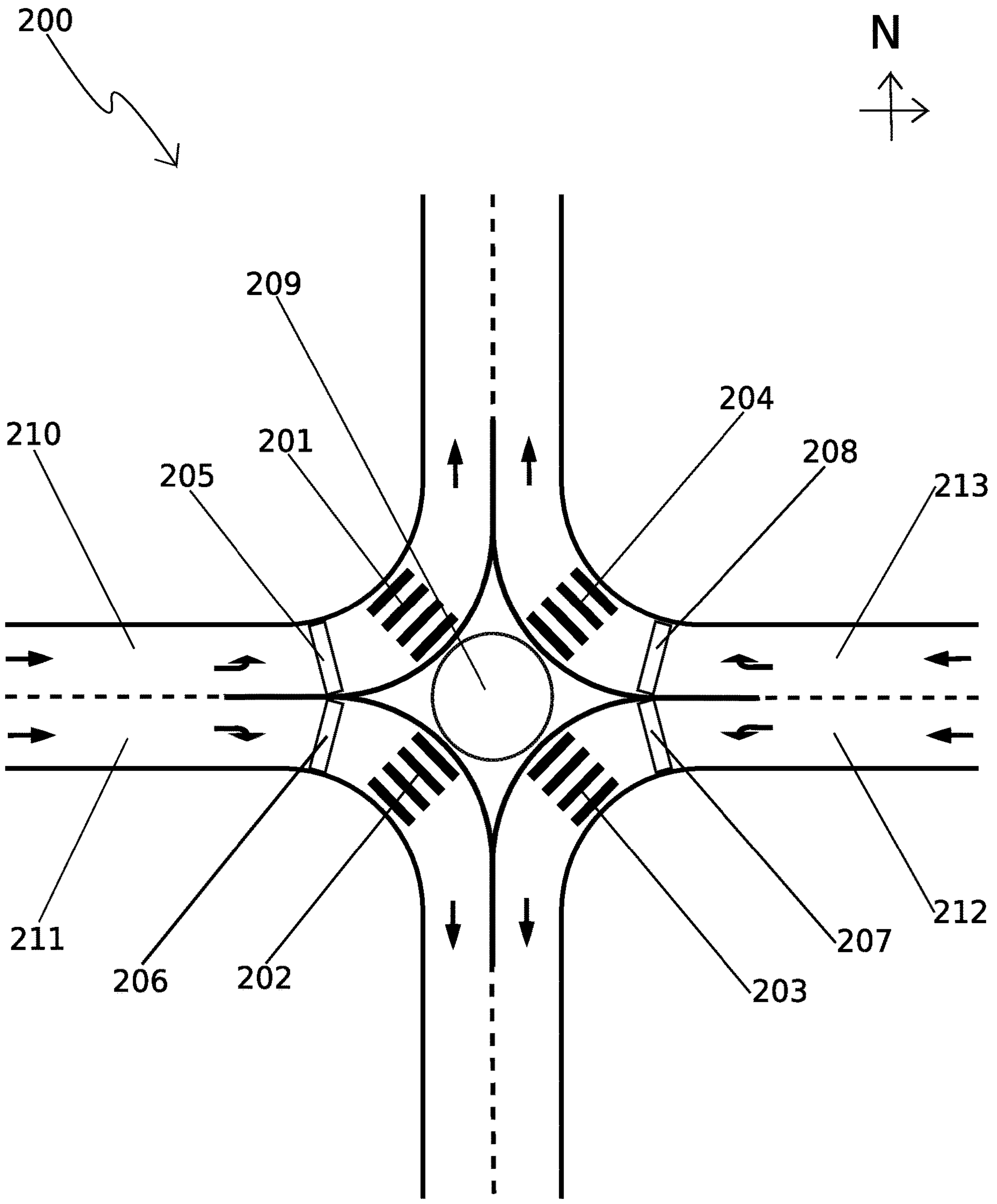
FIG. 2 is a top view of a further embodiment of a double-T type junction according to the invention.

Referring to FIG. 2, there is illustrated a second embodiment of the invention. The configuration of the streets is substantially similar between FIG. 1 and FIG. 2. The street entering the “double-T” junction (200) from the West direction comprises of two lanes, vehicles travelling in the left hand lane (210) are required to turn left at the intersection and exit the “double-T” junction (200) in the North direction, while vehicles travelling in the right-hand lane (211) are required to turn right at the intersection and exit the “double-T” junction (200) in the South direction. The street entering the “double-T” junction (200) from the East direction comprises of two lanes, vehicles travelling in the left hand lane (212) are required to turn left and exit the “double-T” junction (200) in the South direction, while vehicles travelling in the right-hand lane (213) are required to turn right and exit the “double-T” junction (200) in the North direction.

FIG. 2 differs from the embodiment illustrated in FIG. 1 primarily in the way that pedestrians cross the street at the intersection, rather than crossing to an adjacent corner, pedestrians cross this intersection using the crosswalks (201, 202, 203, 204) and the protected central refuge island (209). Also included in FIG. 2 are optional vehicular traffic treatments, including vehicular stop lines (205, 206, 207, 208), vehicular traffic lane marking lines and vehicular traffic lane direction indication markings.

A feature of the “double-T” junction (200) is that an area at the center of the intersection will not be used by vehicular traffic. This area can be used to create a pedestrian refuge island. This central refuge island can be any shape that will fit into the area this is unused by vehicular traffic. A refuge island in this location would normally require some form of protection from vehicular traffic, this could take the form of a raised platform, and/or, physical barriers such as, but not limited to permanent or removable walls, barriers, gates, posts, polls, bollards, hedges or trees. A central refuge island could contain items of street furniture such as, but not limited to benches, mailboxes, drinking fountains, street lighting, advertising, decorative plants or trees. A sufficiently large central refuge island could contain underground or over-ground metro system entrances and/or exits, shops, kiosks, or decorative structures like sculptures or fountains.

A possible advantage of having a central refuge island is that when a pedestrian needs to cross the street at the intersection, only vehicles in one of the lanes entering the intersection (in the case of an intersection with two lanes entering an intersection as per FIG. 2) needs to stop in order for the pedestrian to cross that lane safely to the central refuge island. Similarly, when a pedestrian wishes to cross from the central refuge island to a different sidewalk, only the vehicular traffic in a single vehicular traffic lane is required to stop in order for the pedestrian to cross safely. In addition to being beneficial to traffic flow, this arrangement can mean that pedestrians that wish to cross an intersection diagonally will be required to cross fewer vehicular traffic lanes to reach their destination. In the case of an intersection with two lanes entering an intersection as per FIG. 2, a pedestrian wishing to cross the intersection diagonally via the central pedestrian crossing will only be required to cross two lanes of vehicular traffic, whereas, with a traditional intersection those pedestrians would normally have been required to cross four lanes of vehicular traffic to reach their destination.

Not included in FIG. 2, or in FIG. 1, are indications of where traffic lights could be located. Traffic lights are an optional feature and not a requirement for a “double-T” junction (100, 200). If traffic lights are to be used at a “double-T” junction (100, 200) there are a number of possibilities for their inclusion. Traffic lights could be time controlled, whereby they change colors based on predefined intervals, and/or the traffic lights could be controlled by mechanical switches operated by pedestrians, and/or the traffic lights could be controlled by sensors that detect the levels of vehicular and/or pedestrian traffic. Where a “double-T” junction (100, 200) has multiple traffic lights or multiple pairs of traffic lights, those traffic lights or pairs of traffic lights could operate independently, or they could operate in a synchronized fashion.

Figure 3:
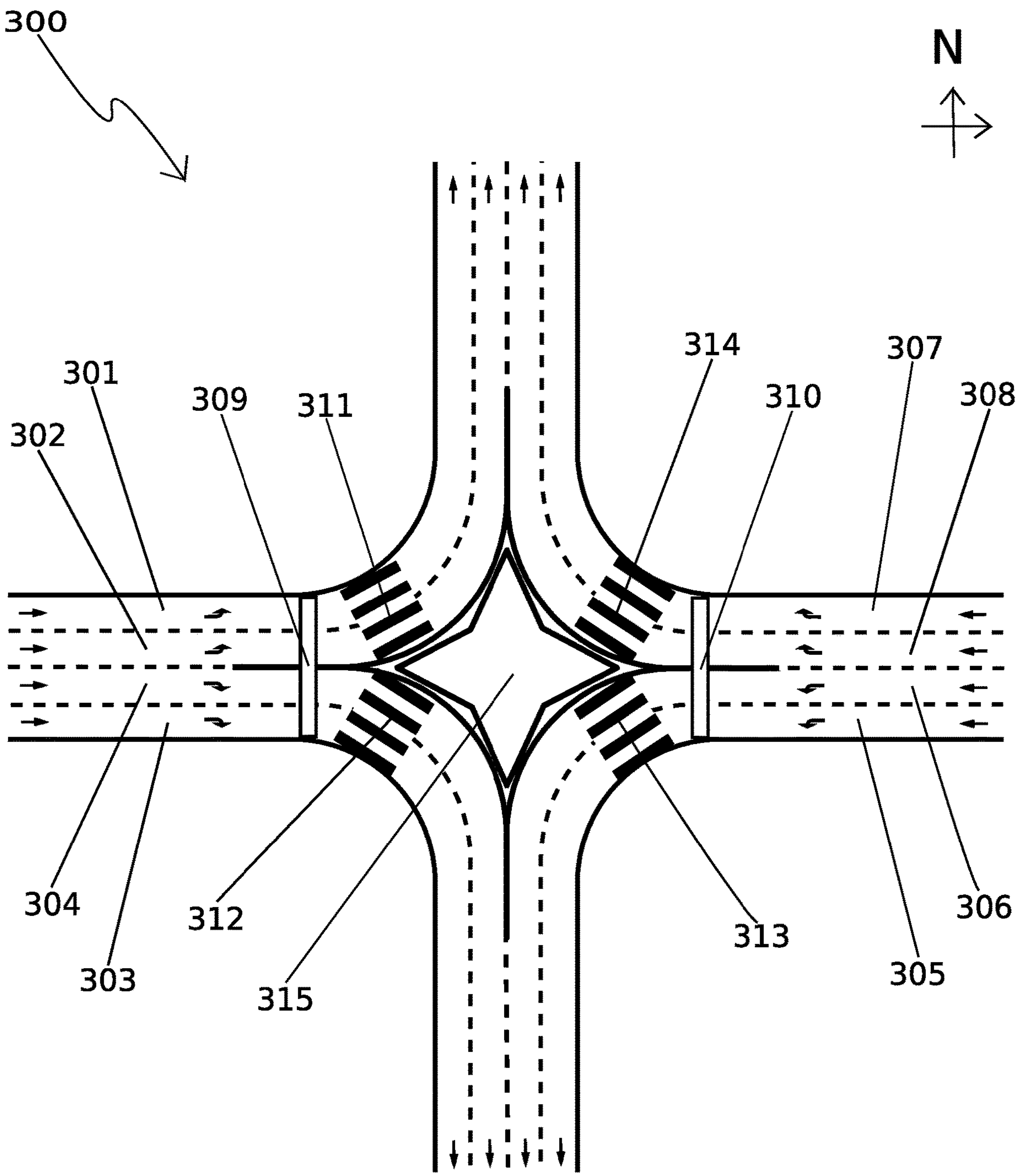
FIG. 3 is a top view of a yet further embodiment of a double-T type junction according to the invention.

FIG. 3, illustrates a further embodiment of the invention. This embodiment differs from that illustrated in FIG. 2 in that the streets are wider, and each street consists of four lanes of vehicular traffic. Four lanes (301, 302, 303, 304) approach the intersection (300) from the West direction, vehicles travelling on the leftmost two of these lanes (301, 302) are required to turn left and leave the intersection in the North direction, whereas vehicles in the rightmost two lanes (303, 304) are required to turn right and leave the intersection (300) in the South direction. Four lanes (305, 306, 307, 308) approach the intersection (300) from the East direction, vehicles travelling on the leftmost two of these lanes (305, 306) are required to turn left and leave the intersection (300) in the South direction, whereas vehicles travelling on the rightmost two lanes (307, 308) are required to turn right and leave the intersection (300) in the North direction.

Also included in FIG. 3 are optional vehicular traffic treatments, including vehicular stop lines (309, 310), vehicular traffic lane marking lines and vehicular traffic direction indication markings. Pedestrian treatments, including crosswalks (311, 312, 313, 314), a refuge Island (315) (also known as a pedestrian refuge or a pedestrian island) are optional features and are included in FIG. 3.

There are a number of differences between some of the optional features included in FIG. 2 and FIG. 3. In FIG. 3 the crosswalks are arranged so that they are closer to the vehicular traffic stop lines, an arrangement that could result in giving crossing pedestrians better visibility of oncoming traffic. Another difference is that the intersection (200) in FIG. 2 has four separate vehicular stop lines, one for each lane of traffic, whereas there are just two stop lines in FIG. 2, both of that stretch from one side of the road to the other. The shape of the protected refuge island is also different between FIG. 2 and FIG. 3.

Figure 4:
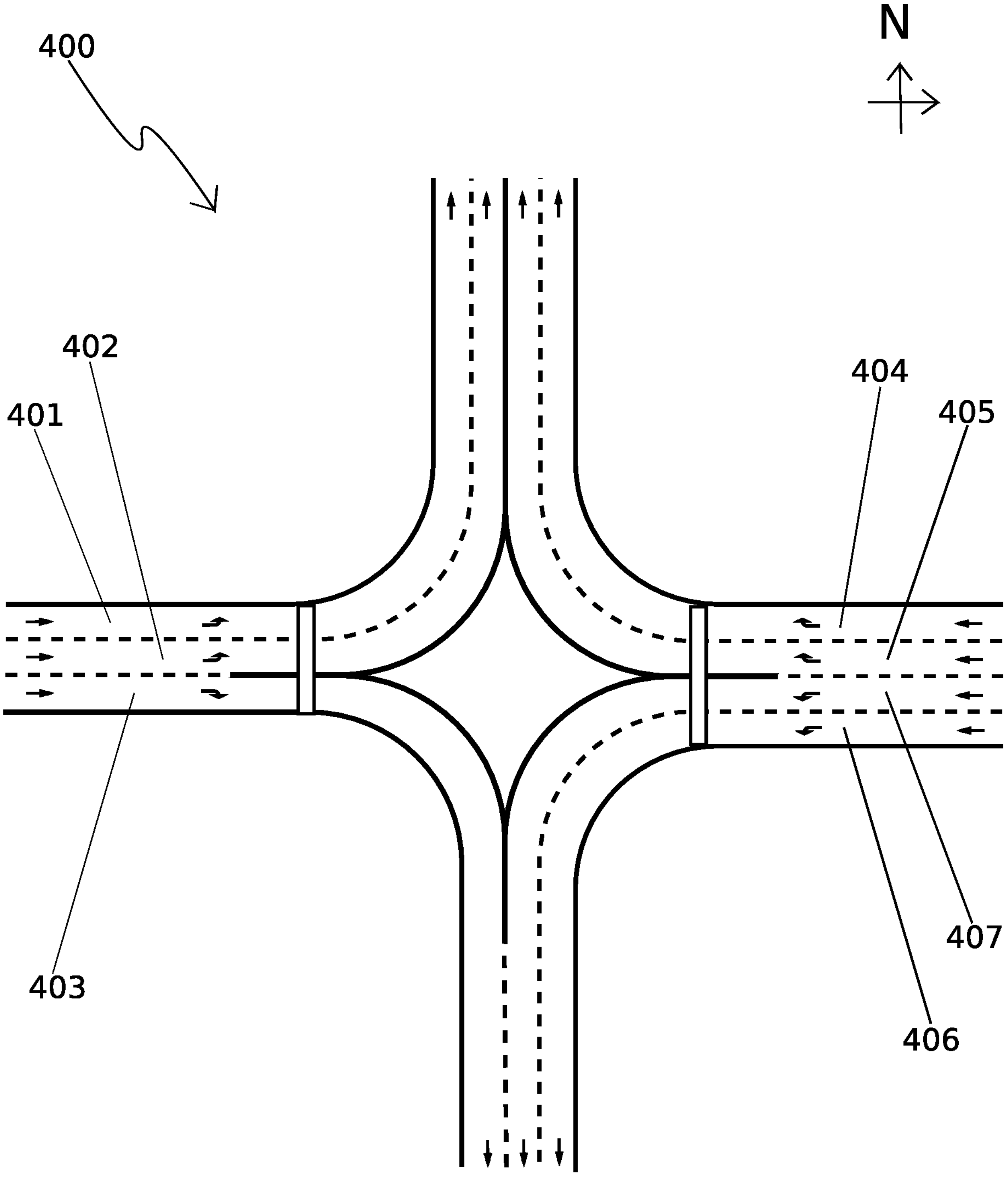
FIG. 4 is a top view of a further embodiment of a double-T type junction according to the invention.

FIG. 4 illustrates another possible configuration for the “double-T” junction (400). In this embodiment three lanes approach the intersection (400) from the West direction, four lanes approach the intersection (400) from the East direction, four lanes leave the intersection (400) in the North direction and three lanes leave the intersection (400) in the South direction. Vehicles travelling on two of the lanes (401, 402) that approach the intersection (400) from the West direction and are required to turn left at the intersection (400) and proceed in the North direction. Vehicles travelling along the lane (403) approach the intersection (400) from the West direction and are required to turn right at the intersection (400) and proceed in the South direction.

Vehicles travelling along the lanes (404, 405) approach the intersection (400) from the East direction and are required to turn right at the intersection (400) and then proceed in the North direction, whereas vehicles travelling in the East direction in lanes (406, 407) are required to turn left at the intersection (400) and then proceed in the South direction.

Figure 5:
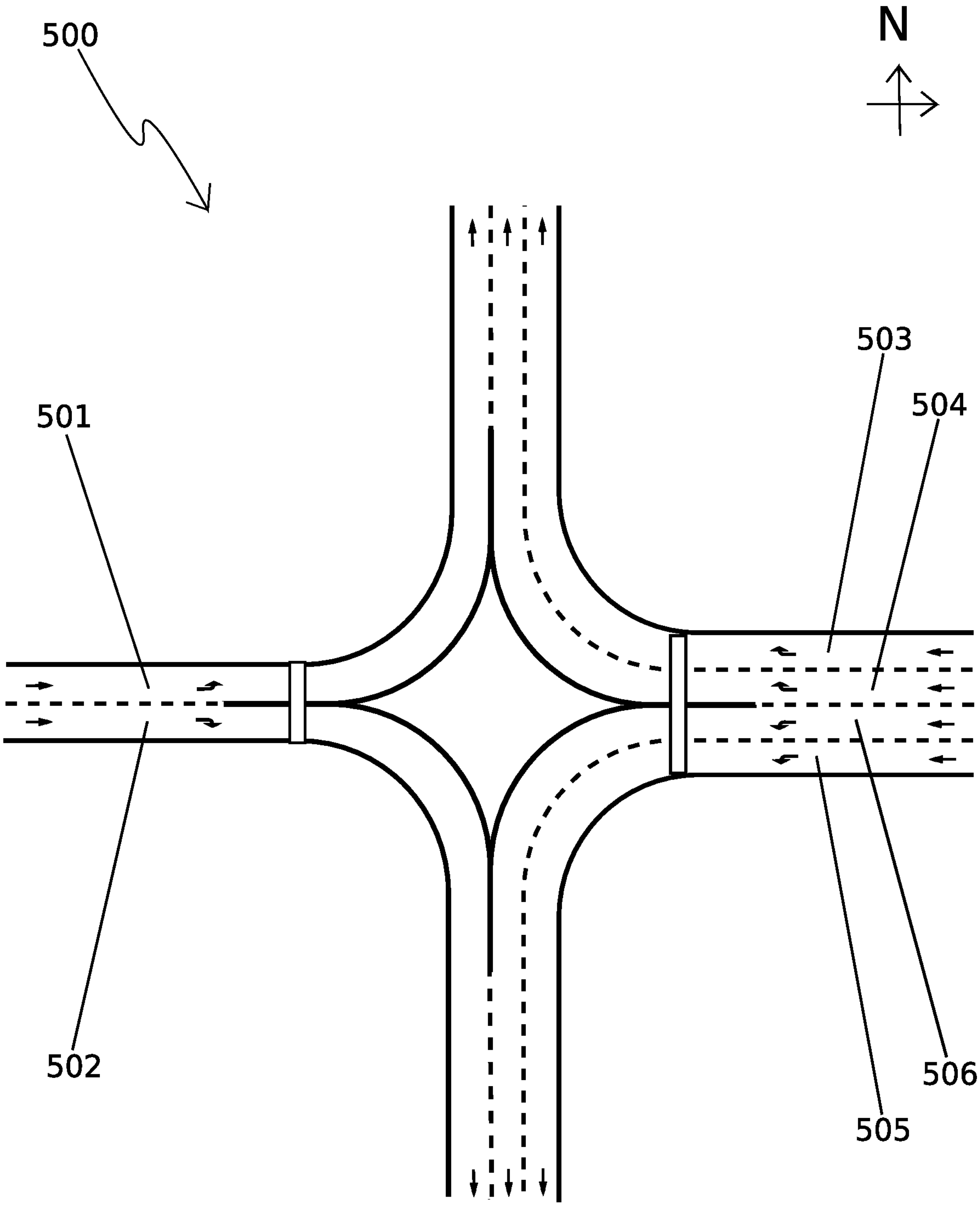
FIG. 5 is a top view of a further embodiment of a double-T type junction according to the invention.

FIG. 5 illustrates another possible configuration for the "double-T" junction (500). In this embodiment two lanes approach the intersection (500) from the West direction, four lanes approach the intersection (500) from the East direction, three lanes leave the intersection (500) in the North direction and three lanes leave the intersection (500) in the South direction. Vehicles travelling on lane (501) approach the intersection (500) from the West direction and are required to turn left at the intersection (500) and proceed in the North direction, whereas vehicles travelling along the lane (502) approach the intersection (500) from the West direction and are required to turn right at the intersection (500) and proceed in the South direction. Vehicles travelling along the lanes (503, 504) approach the intersection (500) from the East direction and are required to turn right at the intersection (500) and then proceed in the North direction, whereas vehicles travelling in the East direction in lanes (505, 506) are required to turn left at the intersection (500) and then proceed in the South direction.

Figure 6:
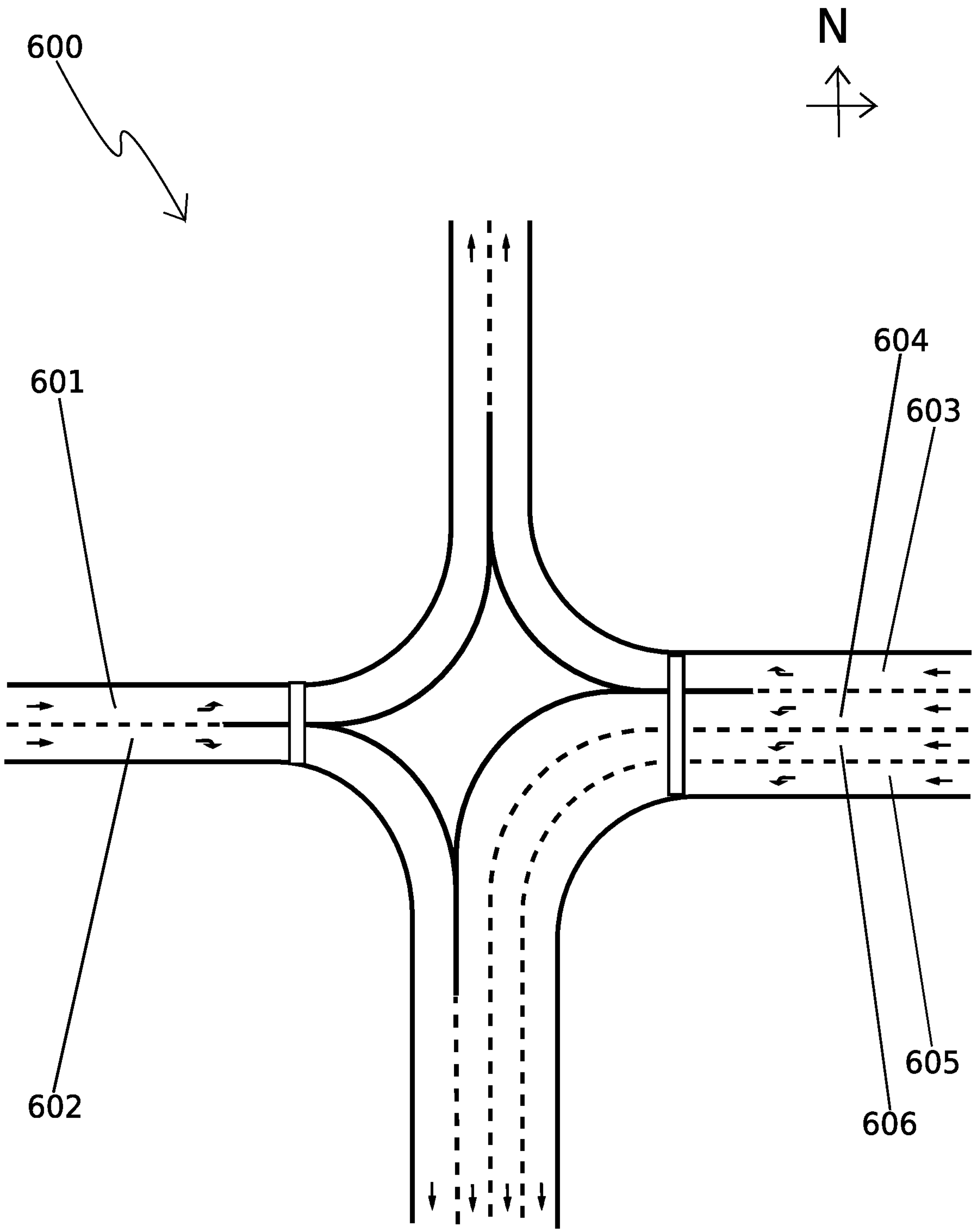
FIG. 6 is a top view of a further embodiment of a double-T type junction according to the invention.

FIG. 6 illustrates another possible configuration for the "double-T" junction (600). In this embodiment two lanes approach the intersection (600) from the West direction, four lanes approach the intersection (600) from the East direction, two lanes leave the intersection (600) in the North direction and four lanes leave the intersection (600) in the South direction. Vehicles travelling on lane (601) approach the intersection (600) from the West direction and are required to turn left at the intersection (600) and proceed in the North direction, whereas vehicles travelling along the lane (602) approach the intersection (600) from the West direction and are required to turn right at the intersection (600) and proceed in the South direction. Vehicles travelling along lane (603) approach the intersection (600) from the East direction and are required to turn right at the intersection (600) and then proceed in the North direction, whereas vehicles travelling in the East direction in lanes (604, 605, 606) are required to turn left at the intersection (600) and then proceed in the South direction.

Figure 7:
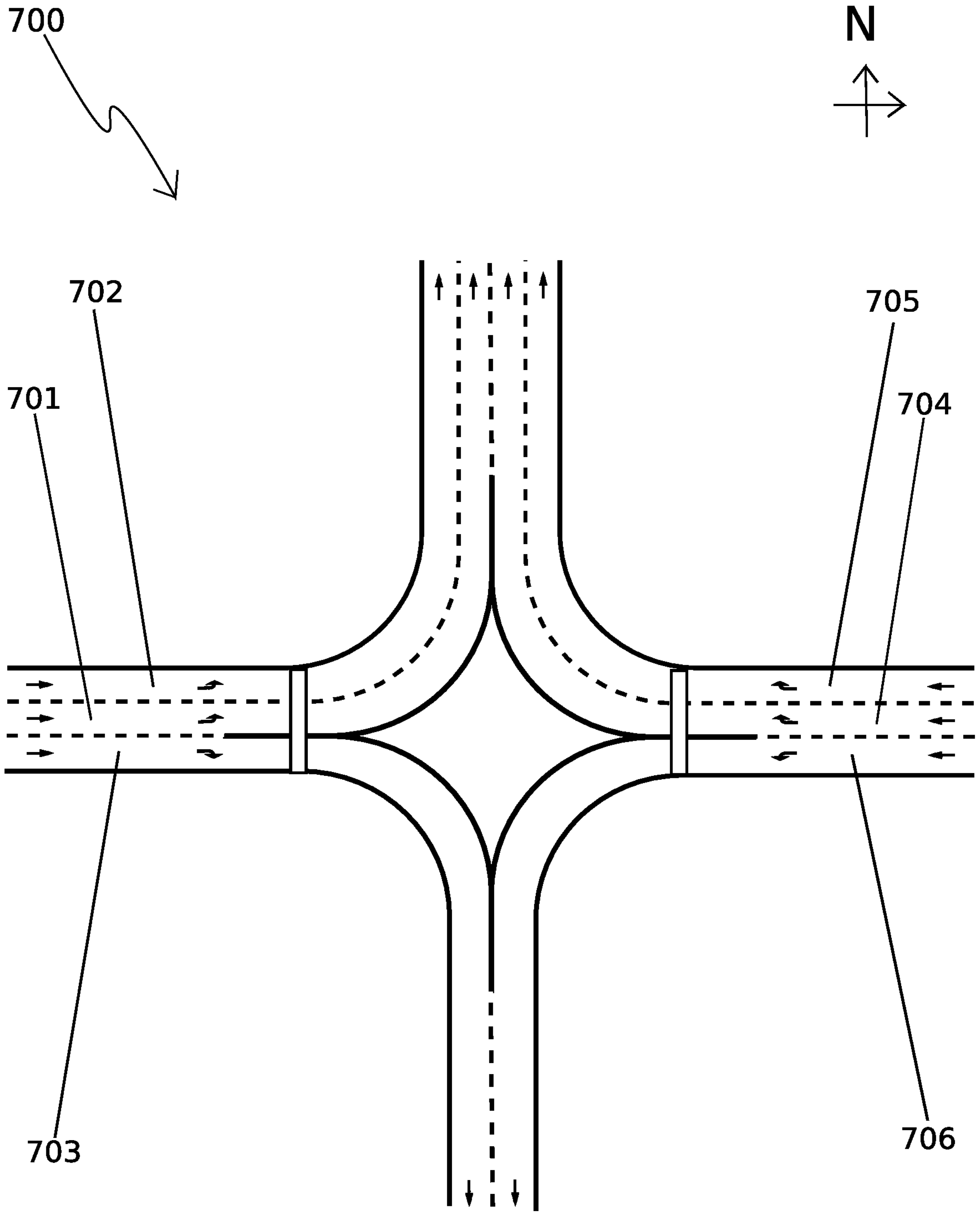
FIG. 7 is a top view of a further embodiment of a double-T type junction according to the invention.

FIG. 7 illustrates another possible configuration for the "double-T junction" (700). In this embodiment three lanes approach the intersection (700) from the West direction, three lanes approach the intersection (700) from the East direction, four lanes leave the intersection (700) in the North direction and two lanes leave the intersection (700) in the South direction. Vehicles travelling on lanes (701, 702) approach the intersection (700) from the West direction and are required to turn left at the intersection (700) and proceed in the North direction, whereas vehicles travelling along the lane (703) approach the intersection (700) from the West direction and are required to turn right at the intersection (700) and proceed in the South direction. Vehicles travelling along lanes (704, 705) approach the intersection (700) from the East direction and are required to turn right at the intersection (700) and then proceed in the North direction, whereas vehicles travelling in the East direction in lane (706) are required to turn left at the intersection (700) and then proceed in the South direction.

It will be appreciated that the embodiments of FIGS. 1 to 7 are only examples of many different types of junctions comprising various lane numbers and configurations that may be formed using the general double-T concept. Other configurations of the "double-T junction" may be constructed to suit requirements. In addition, whilst generally described as a "double-T" junction, it should be understood that the two T-type junctions may not be aligned but rather may be offset. By offset it is meant that the portions comprising the incoming lanes may not necessarily be aligned to directly oppose each other. Likewise, the portions comprising the outgoing lanes may not necessarily be aligned to directly oppose each other. In addition, the two portions comprising the incoming lanes may not necessarily approach the junction such that they are parallel, but rather may approach at oblique angles. Similarly, the two portions comprising the outgoing lanes may not necessarily approach the junction such that they are parallel, but rather may approach at oblique angles.

Figure 8:
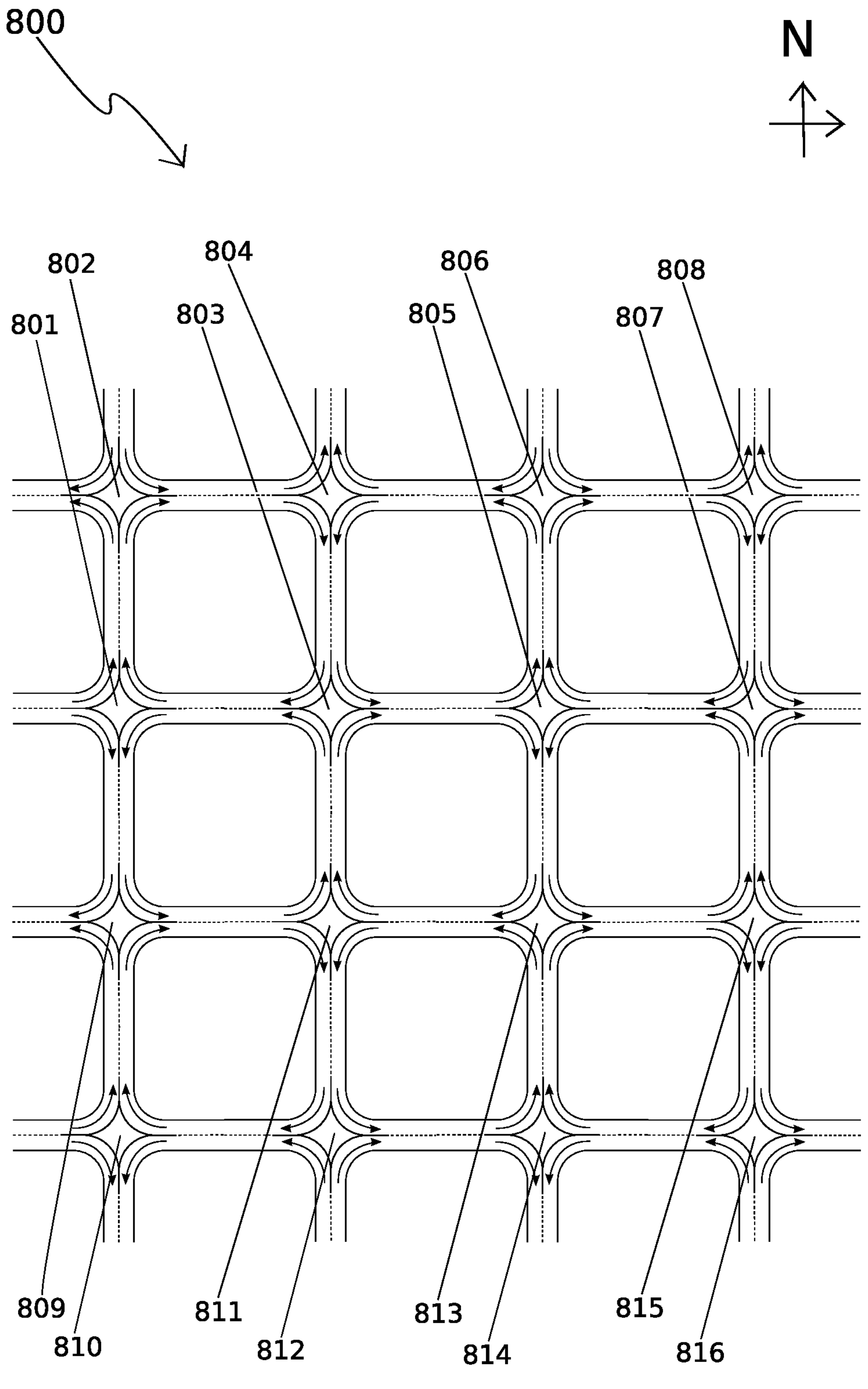
FIG. 8 is a top view which illustrates a plurality of junctions of FIG. 1 deployed in a grid arrangement.

Referring to FIG. 8, the "double-T" junction makes possible a distinct arrangement of one-way streets in a grid-based street layout that can make it possible for a vehicle to navigate a grid-based section of a city from any street to any other street without having to stop at traffic lights for other vehicular traffic, although it may still be a requirement to stop occasionally to permit pedestrians to cross the street. This arrangement of streets that utilize the "double-T" junction is generally herein referred to as the "double-T" grid (800). To implement a "double-T" grid (800), a grid-based urban area would require a plurality of "double-T" junctions with each one oriented at 90 degrees relative to the adjacent "double-T" junction. FIG. 8 illustrates a possible arrangement of a plurality of "double-T" junctions over a section of a grid-based urban area. In the illustrated urban area in FIG. 8, all of the "double-T" junctions have either one of two orientations. The first set (801, 804, 805, 808, 810, 811, 814, 815) are oriented such that vehicular traffic enters these intersections from the West and East directions and leaves the intersections to the North and South directions. The second set of intersections (802, 803, 806, 807, 809, 812, 813, 816) are oriented such that vehicular traffic enters these intersections from the North and South directions and leaves the intersections in the East and West directions. This arrangement ensures that when a vehicle is travelling through this region and it encounters an intersection from the first set of intersections (801, 804, 805, 808, 810, 811, 814, 815), as it continues to travel, it will next encounter an intersection from the second set (802, 803, 806, 807, 809, 812, 813, 816). Similarly, if a vehicle travelling through this area encounters an intersection from the second set (802, 803, 806, 807, 809, 812, 813, 816), it will next encounter an intersection from the first set (801, 804, 805, 808, 810, 811, 814, 815). The intersections are alternated between the first set type intersections and the second set type intersections in both the horizontal and vertical sense within the grid (800).

To Navigate from a specific street to another specific street in an urban area that utilizes a "double-T" grid, it is possible for vehicles to switch lanes between intersections, either in pre-designated road sections between intersections or along the entire road between intersections. To effectively navigate through an urban area that utilizes a "double-T" grid (800), a vehicle must change lanes appropriately between intersections in order to affect their resultant direction after each intersection. With appropriate lane changes, and thus resultant direction changes, it should be possible for a vehicle to navigate from any street to any other street.

An alternative way of looking at this arrangement of one-way streets is to examine the vehicular traffic flow around individual city blocks. When viewed from above, vehicles move around each city block in either a clockwise or a counterclockwise fashion. If the vehicular traffic moves around one particular city block in a clockwise fashion, then the vehicular traffic will move in a counterclockwise fashion around its four adjacent city blocks. Similarly, if the vehicular traffic moves around one particular city block in a counterclockwise fashion, then the vehicular traffic will move in a clockwise around its four adjacent city blocks. For clarity, a city block is defined as four interconnected junctions forming a generally quadrangular arrangement.

Figure 9:
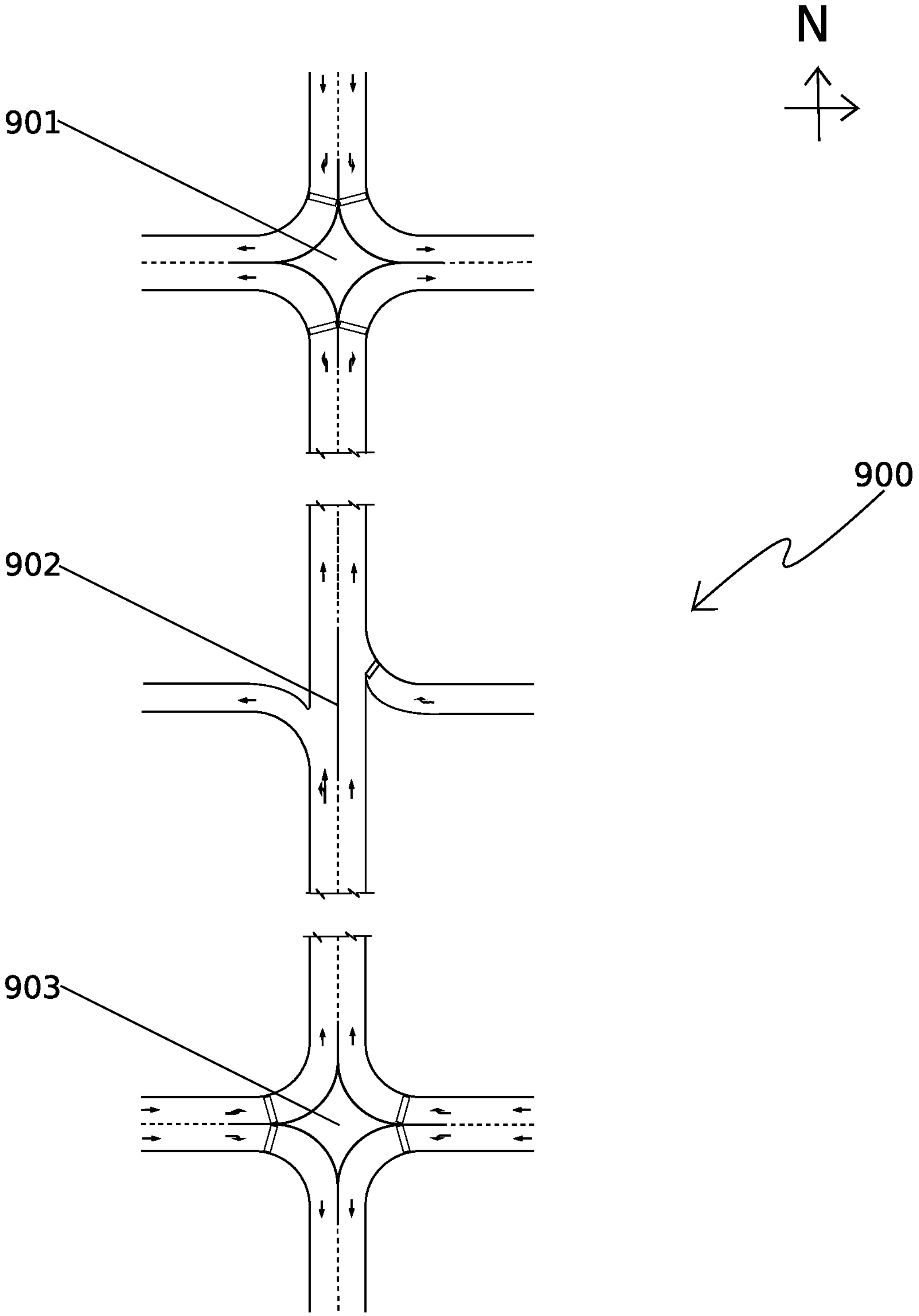
FIG. 9 is a top view which illustrates a plurality of double-T type junctions according to the invention deployed in a free-flowing urban area comprising 3 intersections.

FIG. 9 depicts a length of road (900) with three intersections (901, 902, 903). The North (901) and South (903) intersections are "double-T" junctions and the middle intersection (902) is an intersection that allows the vehicles on the road to move from the South intersection (903) to the North intersection (901) without having to stop. Using intersections such as (902) between two "double-T" junctions allows an urban area to retain the continuous traffic flow advantages of the "double-T" grid without requiring that every intersection in that urban area is a "double-T" junction. The type of intersection used as the intersection between "double-T" junctions can vary from the type (902) used in FIG. 9, many different intersection types are possible. It would be possible to add a traffic light to the intersection (902) which could allow pedestrians to cross the intersection. It would also be possible to use traffic-light controlled conventional intersections in between "double-T" junctions in a grid but these could have a detrimental effect on the average traffic speeds.

Figure 10:
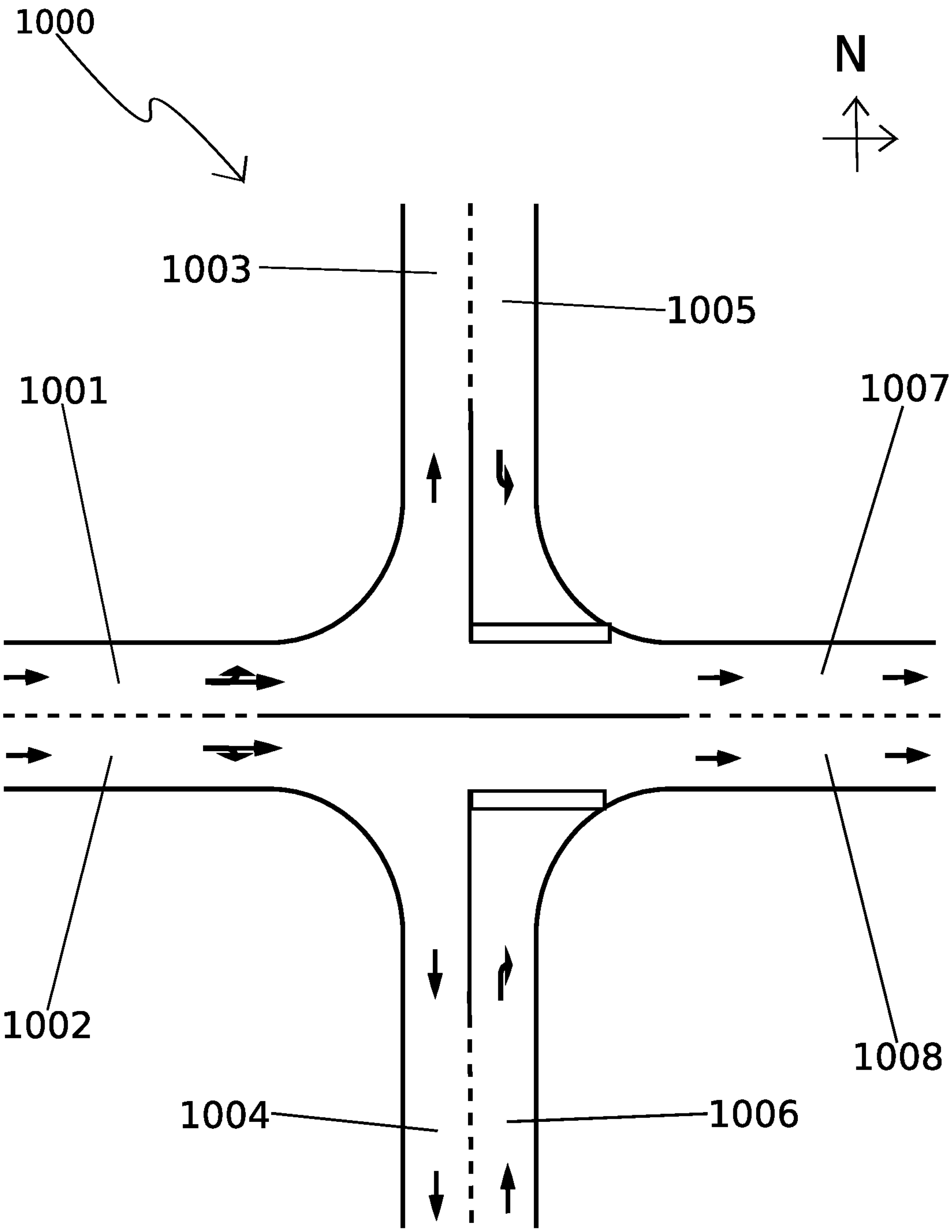
FIG. 10 is a top view of a free-flow intersection that may located between double-T type junctions of any of FIGS. 1 to 7.

FIG. 10 depicts an alternative intersection configuration (1000) that could be used in a grid in between instances of "double-T" intersections. In this configuration, vehicles in lane 1001 and lane 1002 approach the intersection (1000) form the West direction and can continue straight through the intersection (1000) and leave the intersection (1000) in the east direction in lanes 1007 and 1008. Vehicles in lane 1001 have the option of turning left at the intersection (1000) and leaving in the North direction in lane 1003. Vehicles in lane 1002 have the option of turning right at the intersection (1000) and leaving in the South direction in lane 1004. Vehicles in lane 1006 approach the intersection (1000) from the south direction and must yield at the intersection (1000) to oncoming vehicles before merging onto lane 1008 to exit the intersection (1000) in the East direction. Vehicles in lane 1005 approach the intersection (1000) from the North direction and must yield at the intersection (1000) to oncoming vehicles before merging onto lane 1007 to exit the intersection (1000) in the East direction.

Figure 11:
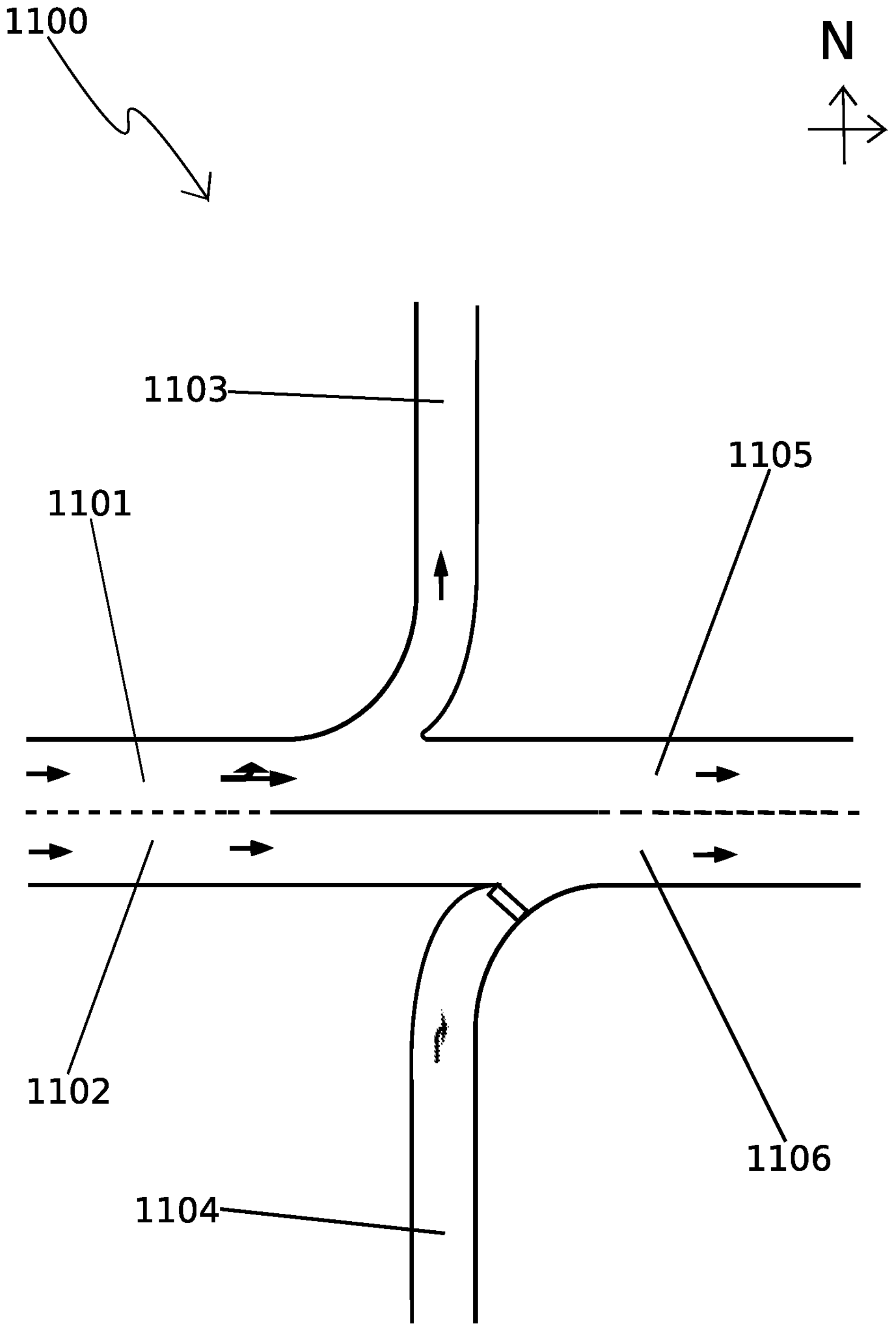
FIG. 11 is a top view of a further embodiment of a free-flow intersection that may located between double-T type junctions of any of FIGS. 1 to 7.

FIG. 11 depicts a further alternative intersection configuration (1100) that could be used in a grid in between instances of "double-T" intersections. In this configuration, two lanes (1101 and 1102) approach the intersection (1100) form the West direction and vehicular traffic in both lanes can continue straight through the intersection (1100) and leave the intersection (1100) in the east direction as lane 1105 and lane 1106. Vehicles in lane 1101 have the option of turning left at the intersection (1100) and leaving the intersection (1100) in the North direction on the single lane one-way street, lane 1103. The single lane one-way street, lane 1104 approaches the intersection (1100) from the south direction and vehicles on lane 1104 must yield at the intersection (1100) to oncoming vehicles before merging onto lane 1106 to exit the intersection (1100) in the East direction.

Figure 12:
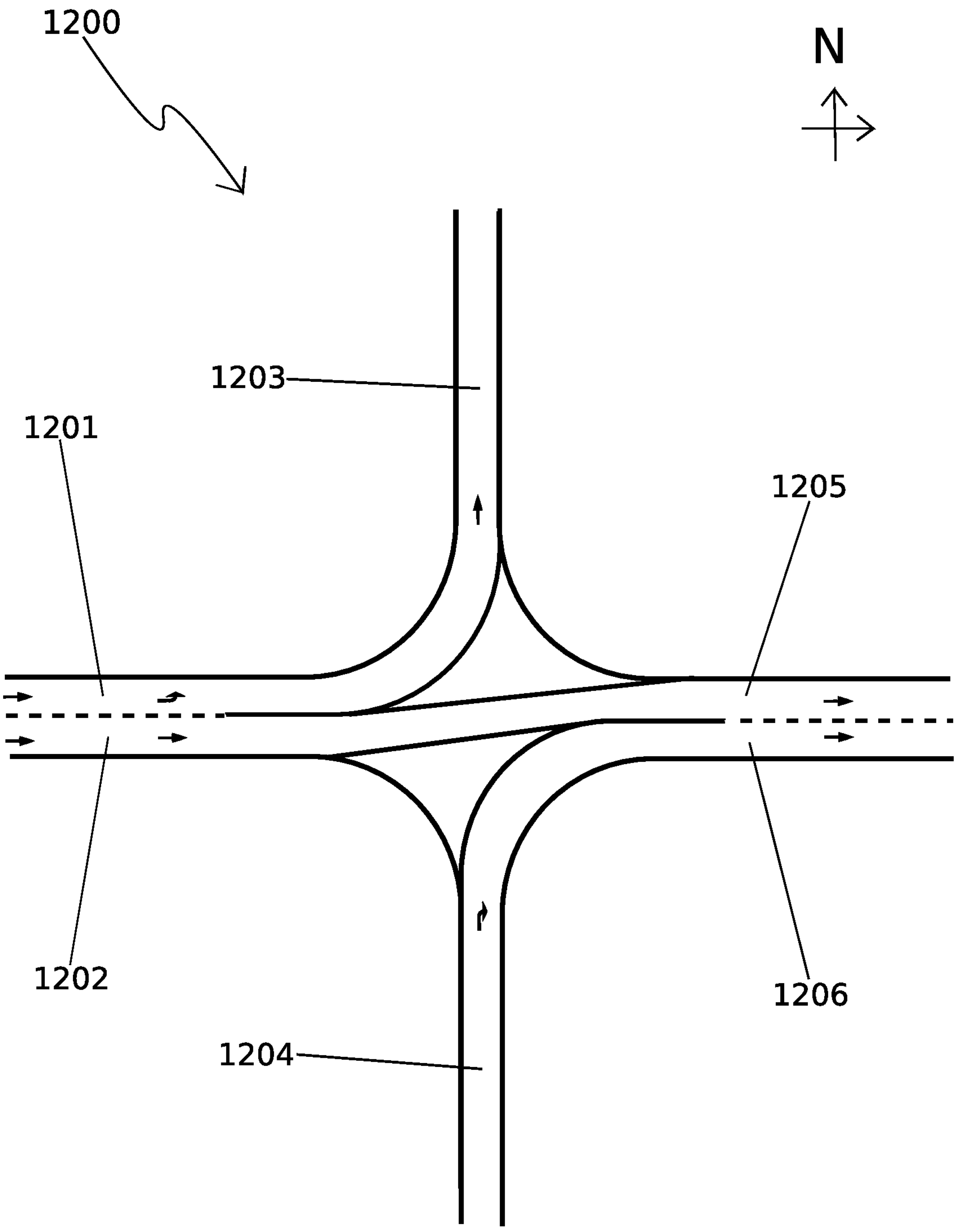
FIG. 12 is a top view of a yet further embodiment of a free-flow intersection that may located between double-T type junctions of any of FIGS. 1 to 7.

FIG. 12 depicts a further alternative intersection configuration (1200) that could be used in a grid between instances of "double-T" junctions. In this configuration, vehicles in lanes 1201 and 1202 approach the intersection (1200) from the West direction. Vehicles in lane 1201 must turn left at the intersection (1200) and leave in the North direction in lane 1203. Vehicles in lane 1202 must proceed through the intersection (1200) and leave the intersection (1200) in the East direction in lane 1205. Vehicles approaching the intersection (1200) from the South direction in lane 1204 are required to turn right at the intersection (1200) and leave the intersection (1200) in the East direction in lane 1206.

The intersections depicted in FIG. 10 to FIG. 12 are not an exhaustive list of all of the types of intersections that could be used in between "double-T" intersections in a grid. Many more configurations are possible, including, but not limited to, versions of the listed intersections that additional lanes, or intersections that combine elements from more than one of the listed intersections. The skilled person would be well able to devise a wide range of suitable intersections.

Figure 13:
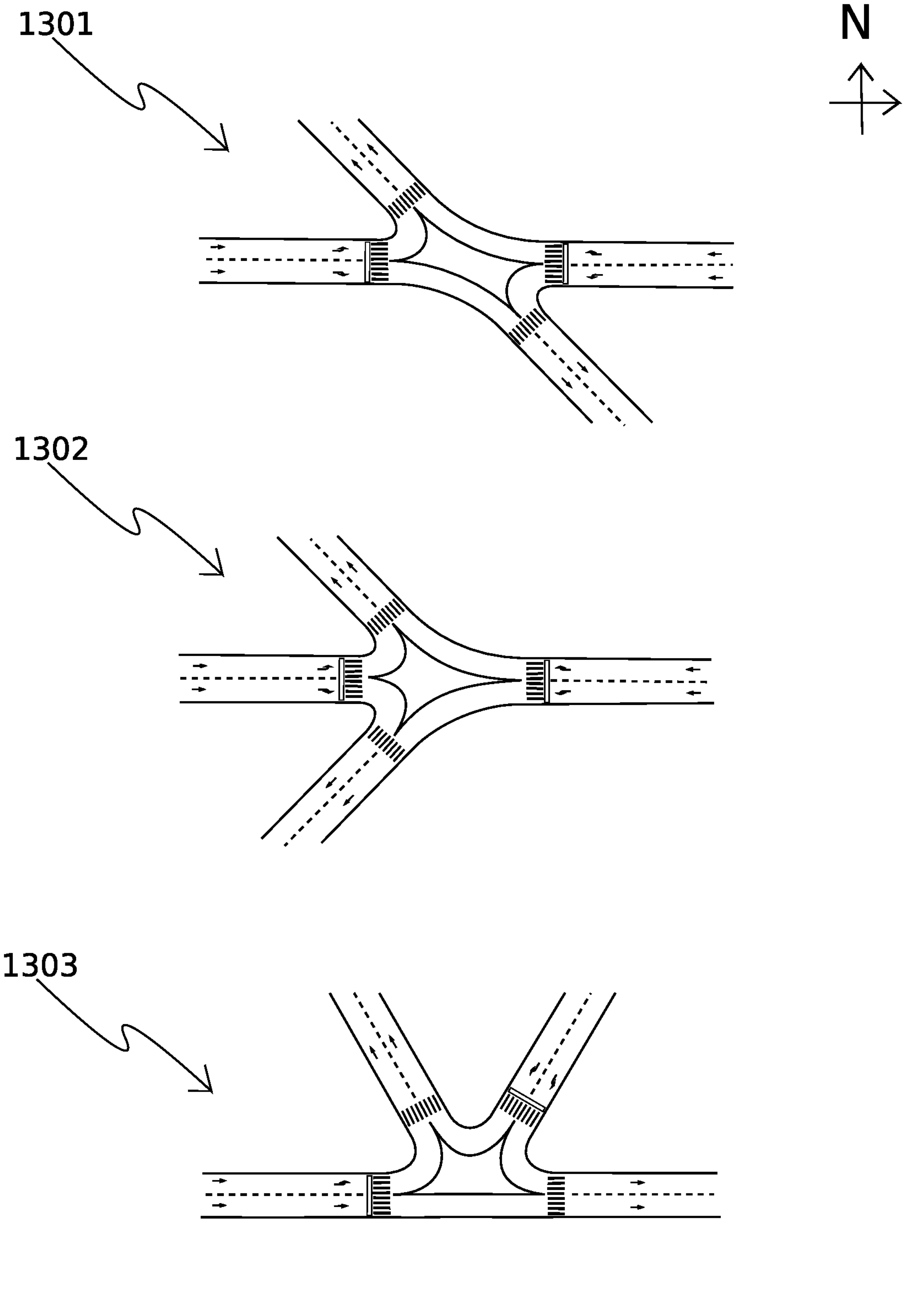
FIG. 13 is a top view which illustrates a plurality of double-T type junctions according to the invention.

FIG. 13 depicts three possible "double-T" intersection configurations (1301, 1302, 1303) whereby the roads of the intersections do not meet at right angles. In the intersection configuration (1301) one road approaches the intersection from the West direction and one road approaches the intersection from the East direction. The roads leave the intersection (1301) in the North-West direction and the South-East direction. In the intersection configuration (1302) one road approaches the intersection from the West direction and one road approaches the intersection from the East direction. The roads leave the intersection (1302) in the North-West direction and the South-West direction. In the intersection configuration (1303) one road approaches the intersection from the West direction and one road approaches the intersection from the North-East direction. The roads leave the intersection (1303) in the North-West direction and the East direction. It should be noted that the embodiments as shown in FIG. 13 are provided for example only, the skilled person would be aware that the roads approaching the "double-T" intersections may approach at any reasonable angles and the roads leaving said intersections may also do so at any reasonable angles.

Although the descriptions above contain many specificities, these should not be construed as limiting the scope of the invention but as merely providing illustrations of some of the presently preferred embodiments of this invention. For example, the intersection can be configured in many different ways based on number of lanes; varying angle of approach legs, etc.

The invention is not limited to the embodiment(s) described herein but can be amended or modified without departing from the scope of the present invention.

The invention claimed is:

1. A traffic intersection comprising first and second approach portions configured to permit travel towards said traffic intersection only from first and second approach directions respectively, and first and second exit portions configured to permit travel away from said intersection only in first and second exit directions respectively, wherein each approach portion is in connection with both exit portions such that traffic may flow from each approach portion to either exit portion to direct approaching traffic from each approach portion to either exit portion, wherein each approach portion, combined with at least one lane from each exit portion, forms a T-Junction such that traffic may travel towards the intersection on approach portion and thereafter may not travel directly forwards but may turn generally right or left onto the first or second exit portion respectively, wherein two T-junctions are formed back to back to form the intersection, wherein the intersection comprises connections portions, said connecting portions forming a transition between the approach portions and the exit portions, and wherein a plurality of pedestrian crossings having traffic lights are provided and positioned to selectably stop traffic on the approach portions and the exit portions, the plurality of traffic lights being synchronised.

2. The traffic intersection of claim 1, wherein the first and second approach directions are generally opposing approach directions.

3. The traffic intersection of claim 1, wherein the first and second exit directions are generally opposing exit directions.

4. The traffic intersection of claim 1, wherein each approach portion comprises a plurality of approach lanes and/or each exit portion comprises a plurality of exit lanes, and optionally the total number of approach lanes is equal to the total number of exit lanes.

5. The traffic intersection of claim 4, wherein each approach lane is in connection with at least one exit lane such that traffic may flow between each approach lane and at least one exit lane.

6. The traffic intersection of claim 1, wherein the intersection is arranged such that the approach portions generally oppose each other and the exit portions are disposed generally perpendicular to the approach portions.

7. The traffic intersection of claim 1, wherein the exit portions of each of the two T-junctions are arranged perpendicularly and positioned such that said exit portions abut about their sides distal their approach portions.

8. The traffic intersection of claim 1, wherein the total number of approach lanes in the first and second approach portions which are in connection with exit lanes in the first exit portion is equal to the total number of exit lanes in said first exit portion, and/or the total number of approach lanes in the first and second approach portions which are in connection with exit lanes in the second exit portion is equal to the total number of exit lanes in said second exit portion.

9. The traffic intersection of claim 1, wherein the intersection comprises a central hub feature disposed centrally of the first and second approach portions and the first and second exit portions said central hub optionally being configured such that traffic may not travel on or otherwise traverse the central hub feature.

10. The traffic intersection of claim 9, wherein the central hub is defined by the innermost side of the innermost lanes of the approach portions and the exit portions.

11. The traffic intersection of claim 9, wherein the central hub is provided with barriers or the like around all or part of the innermost side of the innermost lanes of the approach portions and the exit portions to prevent traffic from travelling onto the central hub.

12. The traffic intersection of claim 1, wherein the connecting portions have a first end in connection with an approach portion and a second end in connection with an exit portion and traffic enters the first end from the approach portion and exits the second end into the exit portion.

13. The traffic intersection of claim 12, the connecting portions being curved such that the direction of traffic exiting the second end thereof is generally perpendicular to the direction of said traffic entering the first end thereof and optionally the central hub being defined by the connecting portions.

14. A street arrangement comprising a plurality of intersections, each of said plurality of intersections comprising first and second approach portions configured to permit travel towards said intersection only from first and second approach directions respectively, and first and second exit portions configured to permit travel away from each said intersection only in first and second exit directions respectively, wherein each approach portion is in connection with both exit portions such that traffic may flow from each approach portion to either exit portion to direct approaching traffic from each approach portion to either exit portion, wherein each approach portion, combined with at least one lane from each exit portion, forms a T-Junction such that traffic may travel towards the intersection on the app and thereafter may not travel directly forwards but may turn generally right or left onto the first or second exit portion respectively, wherein two T-junctions are formed back to back to form the intersection, wherein the intersection comprises connecting portions forming a transition between the approach portions and the exit portions, and wherein a plurality of pedestrian crossings having traffic lights are provided and positioned to selectably stop traffic on the approach portions and the exit portions, the plurality of traffic lights being synchronised.

15. The street arrangement of claim 14, wherein the street arrangement comprises an alternating arrangement of intersections such that each intersection forms a central intersection which connects to four other surrounding intersections, one further intersection being connected by each of the first approach portion, the second approach portion, the first exit portion and the second exit portion, and optionally the four surrounding intersections in connection with the central intersection are rotated relative to the central intersection, when viewed from the top, such that their exit portions are aligned to connect to an approach portion of the central intersection and their approach portions are aligned to connect to an exit portion of the central intersection, and in a most desired option the four surrounding intersections in connection with the central intersection are rotated relative to the central intersection by approximately 90 degrees.

16. A series of intersections comprising an intermediate intersection deployed between two additional traffic intersections, each additional traffic intersections comprising first and second approach portions configured to permit travel towards said intersection only from first and second approach directions respectively, and first and second exit portions configured to permit travel away from said intersection only in first and second exit directions respectively, wherein each approach portion is in connection with both exit portions such that traffic may flow from each approach portion to either exit portion to direct approaching traffic from each approach portion to either exit portion, wherein each approach portion, combined with at least one lane from each exit portion, forms a T-Junction such that traffic may travel towards the intersection on the approach portion and thereafter may not travel directly forwards but may turn generally right or left onto the first or second exit portion respectively, wherein two T-junctions are formed back to back to form the additional intersection, wherein the additional intersection comprises connecting portions, said connecting portions forming a transition between the approach portions and the exit portions, and wherein a plurality of pedestrian crossing having traffic lights are provided and positioned to selectably stop traffic on the approach portions and the exit portions, the plurality of traffic lights being synchronised.

* * * * *